United States Patent [19]

O'Donnell et al.

[11] Patent Number: 4,983,970
[45] Date of Patent: Jan. 8, 1991

[54] METHOD AND APPARATUS FOR DIGITAL PHASED ARRAY IMAGING

[75] Inventors: Matthew O'Donnell, Schenectady; William E. Engeler, Scotia; John J. Bloomer; John T. Pedicone, both of Schenectady, all of N.Y.

[73] Assignee: General Electric Company, Schenectady, N.Y.

[21] Appl. No.: 500,164

[22] Filed: Mar. 28, 1990

[51] Int. Cl.$^5$ ............................................. H03M 1/54
[52] U.S. Cl. .................................. 341/122; 364/178; 364/413.25
[58] Field of Search ............... 341/122, 111, 118, 123, 341/124, 125, 132, 131, 155, 116; 364/178, 413.25, 413.22, 413.13; 367/103, 50, 138, 153; 310/334; 73/625

[56] References Cited

U.S. PATENT DOCUMENTS

| | | | |
|---|---|---|---|
| 4,839,652 | 6/1989 | O'Donnell et al. | 341/122 |
| 4,886,069 | 12/1989 | O'Donnell et al. | 73 X/625 |
| 4,890,268 | 12/1989 | Smith et al. | 310/334 X |
| 4,896,287 | 1/1990 | O'Donnell et al. | 364/754 |
| 4,937,775 | 6/1990 | Engeler et al. | 364/728.03 |

Primary Examiner—William M. Shoop, Jr.
Assistant Examiner—Brian K. Young
Attorney, Agent, or Firm—Marvin Snyder; James C. Davis, Jr.

[57] ABSTRACT

A method for generating a stream of digital data words, each representing an analog signal amplitude from a beam of vibratory energy received by a plurality N of transducers each associated with one of a like number of separate channels of a phased array, uses the steps of: sampling, after a delay of a multiple number of cycles at a fixed frequency F, an analog input signal in each channel at a fixed frequency F for conversion to a digital data word at each sample; then demodulating the digital data word stream in each channel to baseband and reducing the data word rate by a factor D; and phase-rotating the baseband data stream of each channel by a phase difference $\Delta\phi$ determined by the focal range R and steering angle $\theta$ to obtain, along both the sampling delay, a different channel time delay $t_{d,j}$, for each j-th channel, where $1 \leq j \leq N$, necessary to steer and focus the beam to a desired angle/range combination. Apparatus for generating the stream of digital data words is disclosed, and uses a special output-switching section in each channel to allow a pipelined coherent summation to be obtained across the entire phased transducer array.

21 Claims, 6 Drawing Sheets

METHOD AND APPARATUS FOR DIGITAL PHASED ARRAY IMAGING

BACKGROUND OF THE INVENTION

The present invention relates to coherent imaging systems using vibratory energy, such as ultrasound and the like, and, more particularly, to a novel method and apparatus for digital baseband beam formation in which all of a plurality of phased array channels receive a uniform clock signal.

In a recent U.S. Pat. 4,839,652, issued June 13, 1989, a method for phased array beam formation was described. This method uses a plurality N of individual channels each having a digital baseband demodulator which requires a variable clock signal for use with a fixed phase demodulator to perform phased array beam formation with high accuracy. While highly useful, the particular approach of that beam former may experience some practical problems in implementation, as an independent variable-clock signal must be provided for each of the multiplicity of phased array channels. That is, in order to form beams of acceptable quality for real-time phased-array vibratory energy (ultrasound) imaging, a coherent sum across all of the channels of the phased array must be performed with great accuracy. The primary source of coherent summation error is the quantization of the time delay $t_{d,j}$ in each j-th channel (where $1 \leq j \leq N$). In the method of the above-mentioned patent, accurate time delays are provided by deliberately slipping a master clock signal, utilized to synchronize sampling in the analog-to-digital converters (ADC) of each channel, in time intervals small compared to the sampling period of the clock signal itself. It is therefore highly desirable to provide a method and apparatus utilizing a single fixed clock, with common timing provided to each of the array channels, and capable of producing the same quality images as the time-slipped variable clock implementation of the aforementioned patent.

BRIEF SUMMARY OF THE INVENTION

In accordance of the present invention, a method for generating a stream of digital data words, each representing an analog signal amplitude from a beam of vibratory energy received by a plurality N of transducers each associated with one of a like number of separate channels of a phased array, comprises the steps of: sampling, after a delay of a multiple number of cycles at a fixed frequency F, an analog input signal in each channel at a fixed frequency F for conversion to a digital data word at each sample; then demodulating the digital data word stream in each channel to baseband and reducing the data word rate by a factor D; and phase-rotating the baseband data stream of each channel by a phase difference $\Delta\phi$ determined by the focal range R and steering angle $\theta$ to obtain, along both the sampling delay, a different channel time delay $t_{d,j}$, for each j-th channel, where $1 \leq j \leq N$, necessary to steer and focus the beam to a desired angle/range combination.

Apparatus for generating a stream of digital data words, each representing an analog signal amplitude from a beam of vibratory energy received by a plurality N of transducers each associated with one of a like number of separate channels of a phased array, comprises the steps of: means for sampling, after a delay of a multiple number of cycles at a fixed frequency F, an analog input signal in each channel at a fixed frequency F for conversion to a digital data word at each sample; then means for demodulating the digital data word stream in each channel to baseband and reducing the data word rate by a factor D; and means for phase-rotating the baseband data stream of each channel by a phase difference $\Delta\phi$ to obtain, along both the sampling delay, a different channel time delay $t_{d,j}$, for each j-th channel, where $1 \leq j \leq N$, necessary to steer and focus the beam to a desired angle/range combination. A special output-switching section in each channel allows a pipelined coherent summation to be obtained across the entire phased transducer array.

The foregoing invention will be described with particular emphasis to one energy form, e.g. ultrasonic mechanical vibrations, in a presently preferred embodiment; it should be understood that this energy form exemplary and not delimiting.

Accordingly, it is an object of the present invention to provide a novel method of, and apparatus for, providing a digital baseband representation of a vibratory energy beam received by a phased transducer array.

This and other objects of the present invention will become apparent to those skilled in the art upon reading of the following detailed description of the invention, when considered in conjunction with the appended drawings.

DETAILED DESCRIPTION OF THE PRESENT INVENTION

Figure 1A:
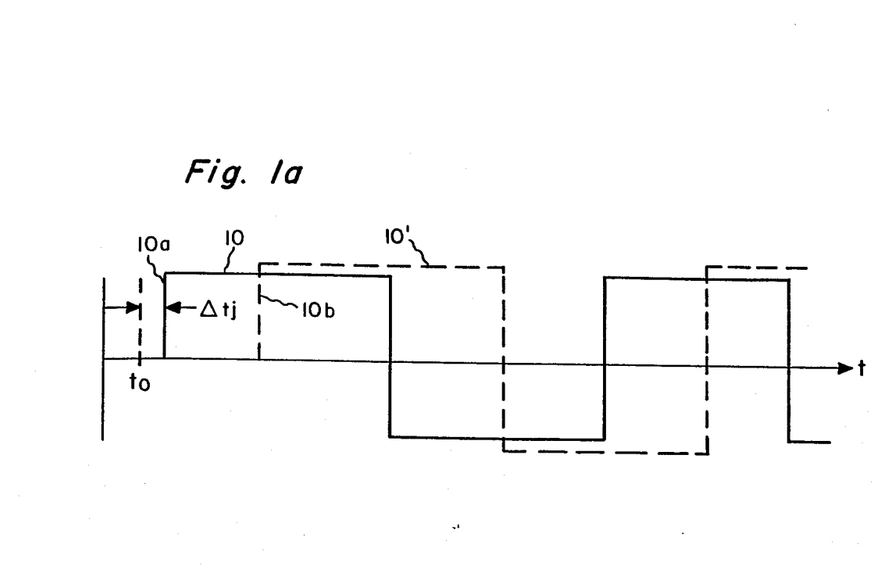
FIGS. 1a and 1b are respective time and phasor diagrams of sampling of waveforms and the time delay-phase rotation equivalents therebetween.

Referring initially to FIG. 1a, in the invention of the above-mentioned U.S. Pat. No. 4,839,652, the baseband reception means in each j-th one, where $1 \leq j \leq N$, of the plurality N of channels of a phased array beam-formation receiver, is dependent upon implementation of a different time delay $\Delta t_j$ between a leading edge 10a of a sampling waveform 10, and a reference time $t_0$, common to all array channels. We now represent the time delay by a phase difference $\Delta\phi$ (FIG. 1b) between a phasor 11 and a phase reference. Typically, this time delay $\Delta t_j$ could range from an essentially zero time interval, equivalent to having a phasor 11a with phase rotation of essentially zero degrees with respect to the time at which a sampling waveform leading edge 10a occurs, and a maximum time interval at which a leading edge 10b, of another sampling waveform 10' representable as a phasor 11b having an essentially 90° phase rotation, occurs. Thus, the phase rotation $\Delta\phi$ of the complex reference phasor 11 is equivalent to a time delay Δt, with a maximum delay of $\Delta T = \frac{1}{4}F$ for 90° rotation at a clock frequency F. Therefore, in the known baseband phased array system wherein the reference phase of the analog baseband demodulators is changed to account for time delays, the same equivalent time delay can be obtained by varying the reference phase of the signal sent to the digital demodulator in each array channel However, a variable-phase digital demodulator with fine phase resolution represents a very complex and sizable circuit.

Figure 1B:
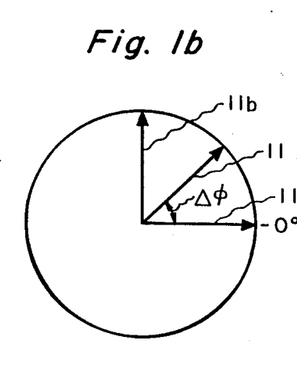
Figure 2:
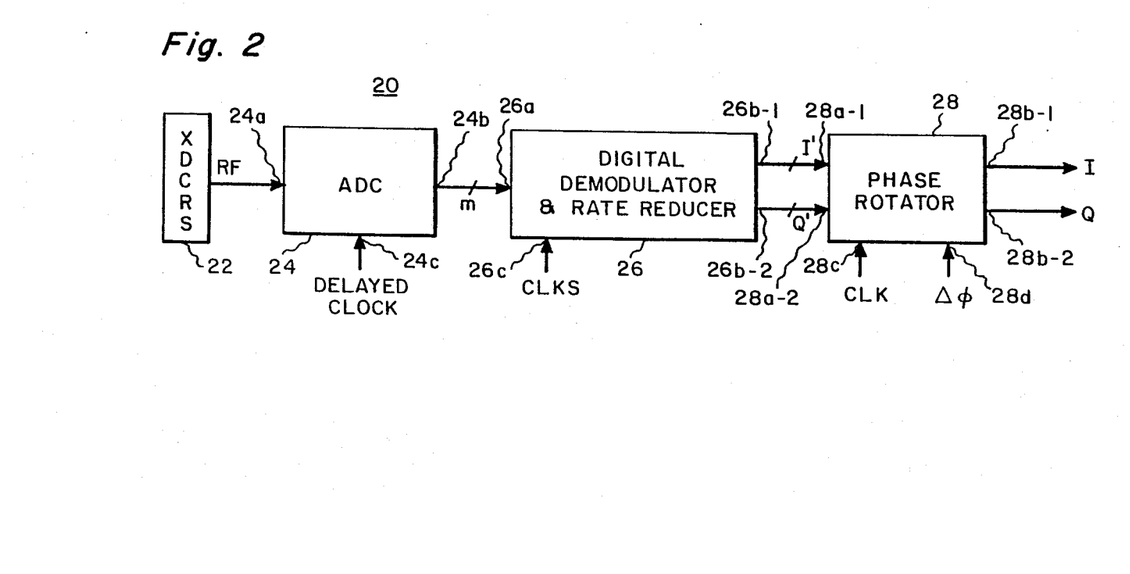
FIG. 2 is a schematic block diagram of a single channel of apparatus in accordance with the present invention.

In accordance with the invention, we use the general time delay-phase rotation equivalents of FIGS. 1a/1b in a digital system having a fixed-phase digital demodulator with a fixed clock, followed by a variable phase-rotation circuit. This two-stage approach is illustrated in FIG. 2, for a single channel 20 of receiver means receiving a RF ultrasound return signal from one of the plurality N of transducers 22 of the array. The RF signal is presented to the analog signal input 24a of a single analog-to-digital converter (ADC) means 24 in each channel; the ADC provides a m-bit-parallel digital data word at an output 24b thereof, responsive to the amplitude of the RF analog signal when a sampling edge of a fixed delayed clock signal is provided at a sampling input 24c of the ADC. The m-bit data word is provided to a data input 26a of a digital demodulator and rate reducer means 26 which provides a pair of multi-bit data words (i.e. a first in-phase I' data word at a first output 26b-1, and a second, quadrature-phase Q' data word at a second output 26b-2) at baseband, responsive to clock signals provided at a clock input 26c. The digitally-demodulated and decimated (i.e. rate-reduced) quadrature-phase baseband data words I' and Q' are then finely delayed by equivalent phase-rotation in phase rotator means 28, in accordance with the principles of the present invention, so that the I' data word at input 28a-1 and the Q' data word at input 28a-2 are rotated in accordance with the clock signals at input 28c and the variable phase control data Δφ at input 28d, to account for differences in time delay between the fixed sample clock (which sets coarse time delay (with resolution set by the delayed clock signal at ADC input 24c) and the desired total delay, so that an in-phase I data word and a quadrature-phase Q data word for proper beam formation are provided at respective phase rotator outputs 28b-1 and 28b-2. Thus, in the configuration of the present invention, the delayed clock to input 24c acts as a coarse time delay control and the phase rotation information at input 28d acts as a fine time delay control. The ADC and digital demodulator/rate reducer means of each channel apparatus 20 can be the same means as illustrated in the aforementioned patent.

Figure 3A:
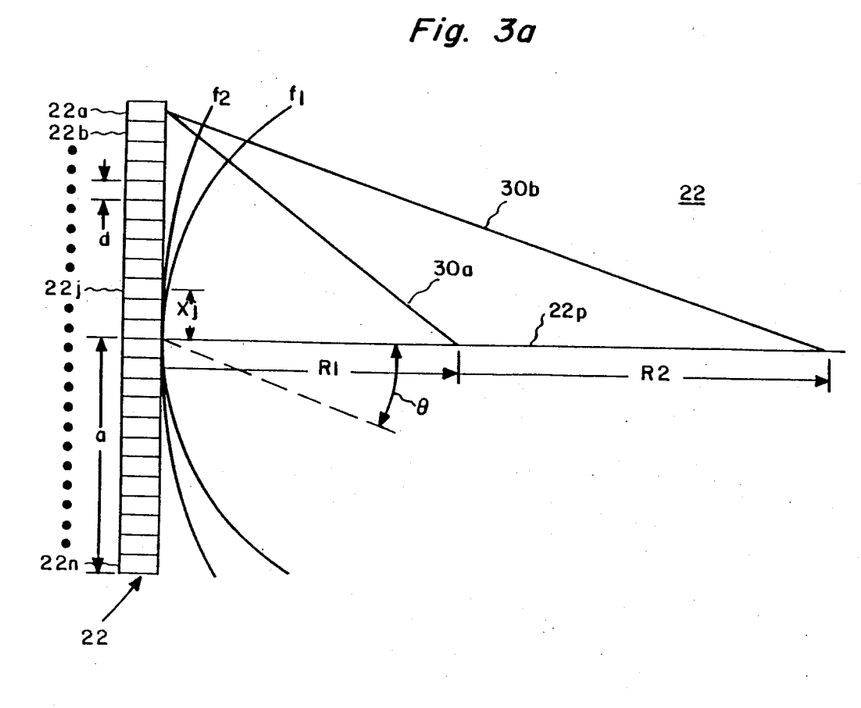
FIGS. 3a and 3b are respective schematic and phasor illustrations of dynamic focus with a phased array, and useful in appreciating the present invention.
Figure 3B:
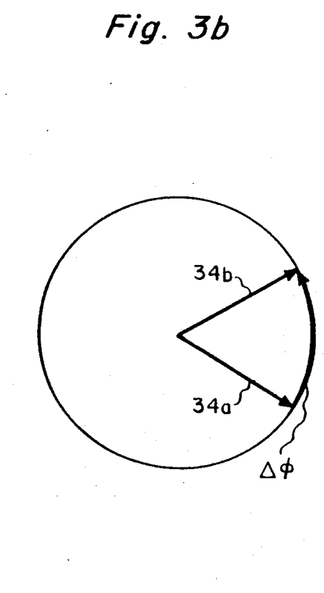

Referring now to FIGS. 3a and 3b, it will be seen that a phased array 22 of transducers 22a–22n forms a beam 32 by dynamically focusing energy along one of focus curves $f_1$ (for nearer focal distance R1) or focal curve $f_2$ (for further focal distance R2); the beam can also be steered to be focussed along the normal 22p to the array, or at an angle θ thereto. The complete focus/steering time delay function $t_{dj}$ is given, for the j-th channel, by:

$$t_{dj} = \frac{X_j}{V}\sin\theta + \frac{X_j^2\cos^2\theta}{2RV}$$

where V is the velocity of the energy in the medium 32 and $X_j$ is the transducer displacement from the array centerline 22p. As seen in FIG. 3b, the same effective channel time delay $t_{dj}$ can be achieved by phase rotation of each transducer original phasor 34a by an amount Δφ to a final phasor 26b; the clock in the signal processing chain can now be fixed, and a fine adjustment made by "phase rotation" for a given beam direction θ and focal range R.

Figure 4:
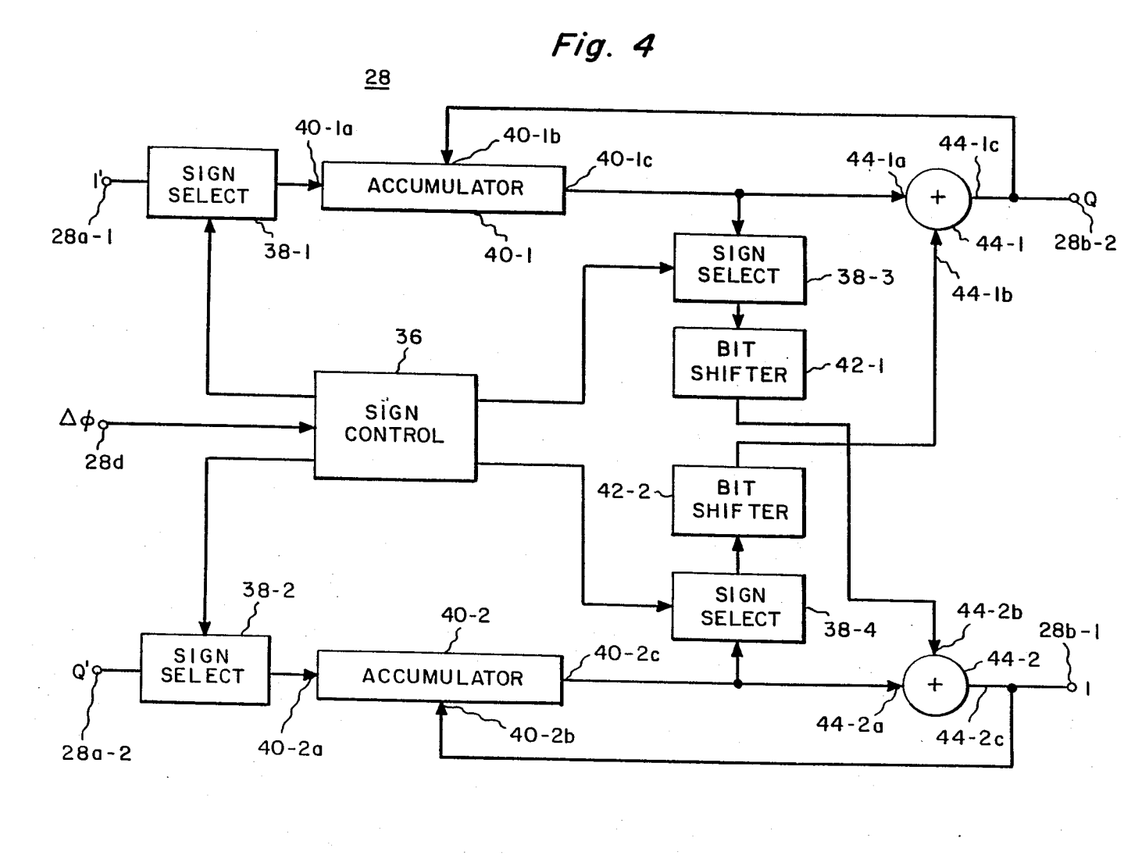
FIG. 4 is a schematic block diagram of a CORDIC phase rotator for use in the channel apparatus of FIG. 2.

Referring now to FIG. 4, an efficient means 28 for digital data phase rotation, for use in each channel receiving means 20 of FIG. 2, is based on the CORDIC algorithm, and has been described and claimed in co-pending allowed U.S. application Ser. No. 200,491, filed May 31, 1988, assigned to the assignee of the present application and incorporated herein in its entirety by reference. Specifically, as shown in FIG. 1 of the above-mentioned allowed application, a sign control means 36 receives the differential phase (Δφ) data from input 28d and provides sign select control bits to four different sign select means 38-1 through 38-4. After selecting the proper sign in means 38-1 (for the I' data at input 28a-1) or in means 38-2 (for the Q' data at input 28a-2), the sign-selected data appears at a first input 40-1a or 40-2a, respectively, of accumulator (add and store) means 40-1 or 40-2. Additional data provided at an additional accumulator input 40-1b/40-2b is added to the data at first input 40-1a/40-2a to provide a sum which is stored; the accumulated stored data is then provided at output 40-1c/40-2c. This data is provided to the remaining sign select means 38-3/38-4, where the sign is either maintained or inverted, under control of the associated sign control means 36 output; the sign-selected accumulated data is shifted one bit left in one of shift means 42-1 or 42-2 to form an arithmetic precursor. Each of first or second adder means 44-1/44-2 has a first input 44-1a/44-2a receiving the output of the associated accumulator 44-1c/44-2c, and has a second input 44-1b/44-2b receiving the bit-shifted, sign-selected output from the accumulator in the opposite inphase/quadrature-phase line; thus, the output of the I' bit shifter 42-1 is cross-connected to second adder second input 44-2b, while the output of the Q' bit shifter 42-2 is cross-connected to the first adder second input 44-1b. The first adder output 44-1c provides the Q quadrature-phase data word at output 28b-2, which is fedback to the first accumulator second input 40-1b; the second adder output 44-2c provides the I in-phase data word at output 28b-1, which is also fedback to the second accumulator second input 40-2b.

Figure 5:
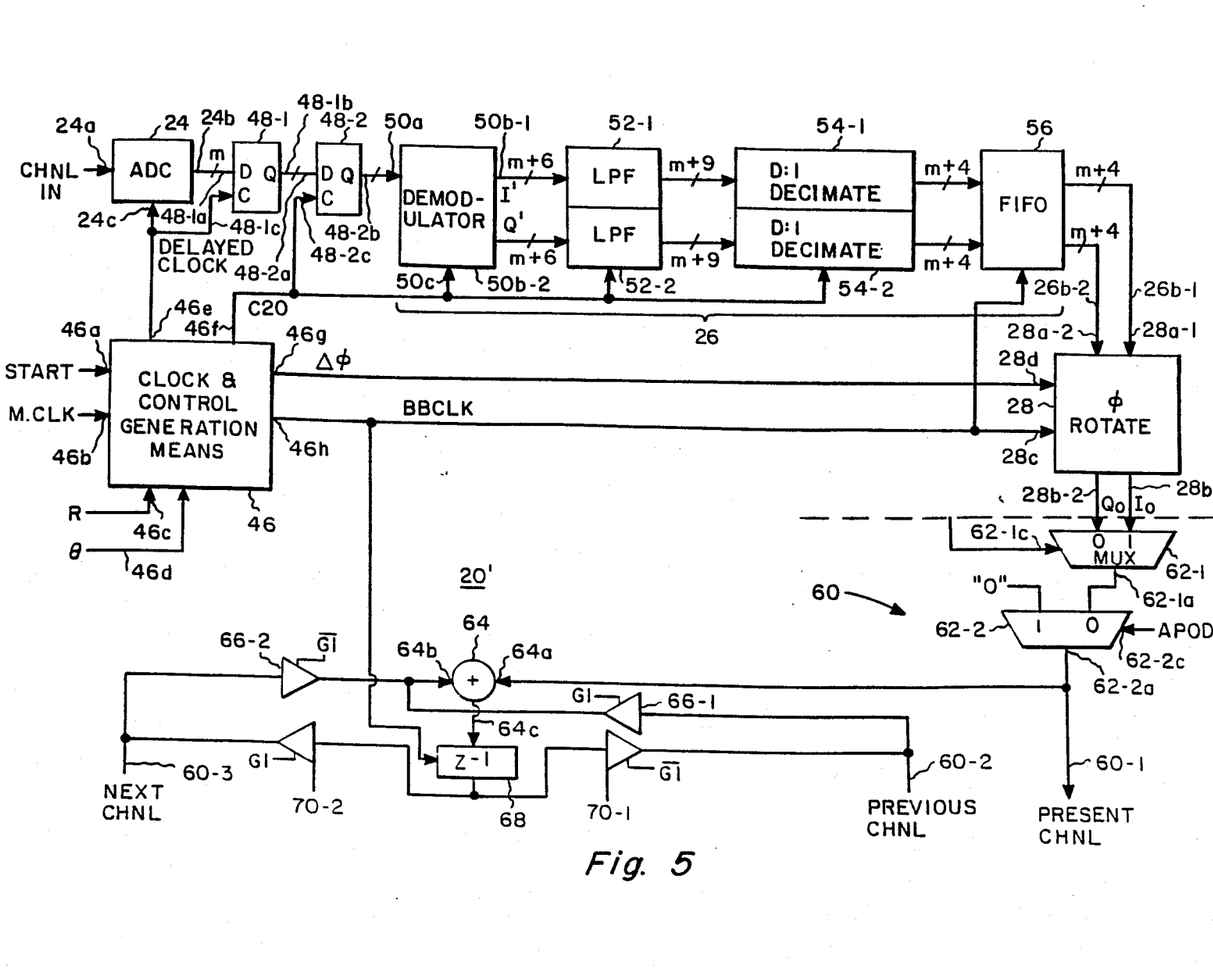
FIG. 5 is a schematic block diagram of the presently preferred embodiment of a channel receiver.

Referring now to FIG. 5, the presently preferred embodiment of a reception means 20' for one channel is shown; each system will have N identical means 20', each receiving a RF signal from a different transducer of the phased array. A channel clock and control generation means 46 receives a start signal at a first input 46a and receives a master clock MCLK signal at an input 46b; range R and angle θ data are received at inputs 46c and 46d, respectively, to generate a delayed clock (DLYDC) signal at a first output 46e; a common clock (C20) signal, here at one-half the master clock frequency, at another output 46f; a Δφ phase rotation control signal at an output 46g; and a baseband clock (BBCLK) signal at an output 46g. Means 46 can be a suitable logic portion of a reception channel integrated circuit, a programmed microprocessor/RAM/ROM subsystem, and the like. A selected edge of the delayed clock signal is utilized as the strobe signal at clock input 24c of the ADC means 24, and the other signal edge can be utilized as a clocking signal at a clock input 48-1a of a first D-type flip-flop means 48-1, receiving the m-bit digital data word from the ADC means data output port 24b at its data D input. The data temporarily stored in the m-parallel stages of register flip-flops 48-1 is then reclocked into the m-parallel stages of a second D-type flip-flop means 48-2, responsive to the channel common (C20) clock signal. The re-clocked data is now synchronized with the fixed-phase common (C20) clock signal, rather than with the variable-phase DLYDC delayed clock signal, so as to be in time-synchronization with the C20 or rate-reduced baseband BBCLK clock used in the rest of the channel. The re-clocked digital data is provided at the data input 50a of a baseband demodulator 50 means, which is a first portion of the demodulator-and-rate-reducer means 26'. Baseband demodulated in-phase I' data is provided at a first output 50b-1 and baseband demodulated quadrature-phase Q' data is provided at a second output 50b-2 of the demodulator means 50, responsive to the channel common clock C20 signal at a clock input 50c thereof. The I' and Q' data is filtered by digital lowpass filter (LPF) means 52-1 or 52-2, respectively, and the filtered baseband data words are provided to the respective inputs of an associated one of D:1 decimation means 54-1 or 54-2, for decimation responsive to the baseband clock BBCLK signal. The decimated baseband signals are stored in a first-in, first-out (FIFO) register means 56, where the decimated data words are synchronized and clocked out responsive to a selected edge of baseband clock signal, to provide in-phase output $I_o$ data words at a first output 56b-1 and quadrature-phase output $Q_0$ data words at a second output 56b-2. Following decimation and delay, the quadrature baseband words go to the phase rotation means 28. Means 28 receives the baseband clock BBCLK signal at its clock input 28c and the differential phase $\Delta\phi$ information at input 28d. The phase-rotated data words I and Q are each provided from means 28 to an associated one of inputs of an output section 60.

Output section 60 receives the $I_0$ in-phase data words and the $Q_0$ quadrature-phase data words for application respectively to the zero-selected "0" or one-selected "1" inputs of a first multiplex MUX means 62-1; the data word provided at the MUX means output 62-1 is determined in accordance with the state of the baseband clock BBCLK signal received at a control input 62-1c from control means 46. Thus, during half of the baseband clock time interval, the output in-phase data word $I_0$ is provided at first MUX means output 62-1a, while the output quadrature-phase $Q_0$ data word is provided at output 62-1a ; during the other half of the baseband clock cycle. This stream of interleaved inphase/quadrature-phase output data words is provided to the zero-select "0" input of a second MUX means 62-2; a permanent logic zero level is provided to the "1" input of means 62-2, for use in array apodization, if commanded by an apodization APOD signal at a control input 62-2c of this second MUX means. The second MUX means output 62-2a is connected to a first, or present channel (CHNL), output 60-1 of the output section of each channel reception means 20'. This data word is also provided to a first input 64a of an adder means 64. A second adder means input 64b receives data from the output of either a first gate 66-1 or a second gate 66-2, respectively connected to a previous channel input/output port 60-2 or a next channel input/output 60-3. Thus, if a gate data bit $G_1$ has a high logic level, the previous-channel data port 60-2 is conducted through gate 66-1 to input 64b, while the gate 66-2 is open and prevents the next-channel data at port 60-3 from being applied to input 64b. Conversely, if the gating signal $G_1$ has its opposite (low) logic state, gate 66-2 is enabled and the next-channel data word from port 60-3 is applied to adder second input 64b while gate 66-1 is disabled and prevents previous-channel data from being applied to that input 64b from port 60-2. The adder output 64c is delayed by one baseband clock time interval in a delay ($z^{-1}$) means 68. The delayed adder output is provided to the input of both output gates 70-1 and 70-2, each configured to be operated by a different state of the gate control G1 signal provided thereto. The gate control signal state for output gates 70 is opposite to the state of the gate control signal applied to the input gates 66 connected to the same port 60-2/60-3. Thus, the previous-channel port 60-2 output gate 70-1 receives the inverse (i.e. the $\overline{G1}$ signal) of the gate G1 signal provided to the previous-channel input gate 66-1 and the next-channel output gate 70-2 receives the gate-true $G_1$ signal which is the inverse of the gate-false signal $\overline{G1}$ signal applied to the next-channel input gate 66-2 Therefore, if the previous-channel data at port 60-2 was present at second adder input 64b, and is added to the present channel data at input 64a, the delayed sum is passed by gate 70-2 and appears at next channel port 60-3, which is now an output port. Conversely, if the next-channel port 60-3 was the input port, gate 66-2 provides the data from port 60-3 to adder input 64b, for addition to present channel data at input 64a, and he delayed sum data at the output of means 68a is passed through gate 70-1 and appears at the previous-channel port 60-2, which is now an output port. This gating allows pipeline addition of each sequential channel data to the sum of the data from the other channels, in either direction, to allow for the coherent sum of data words to be formed for $\theta$, the angular offset of the beam from the array perpendicular, being in either positive or negative direction with respect to the array.

Figure 6A:
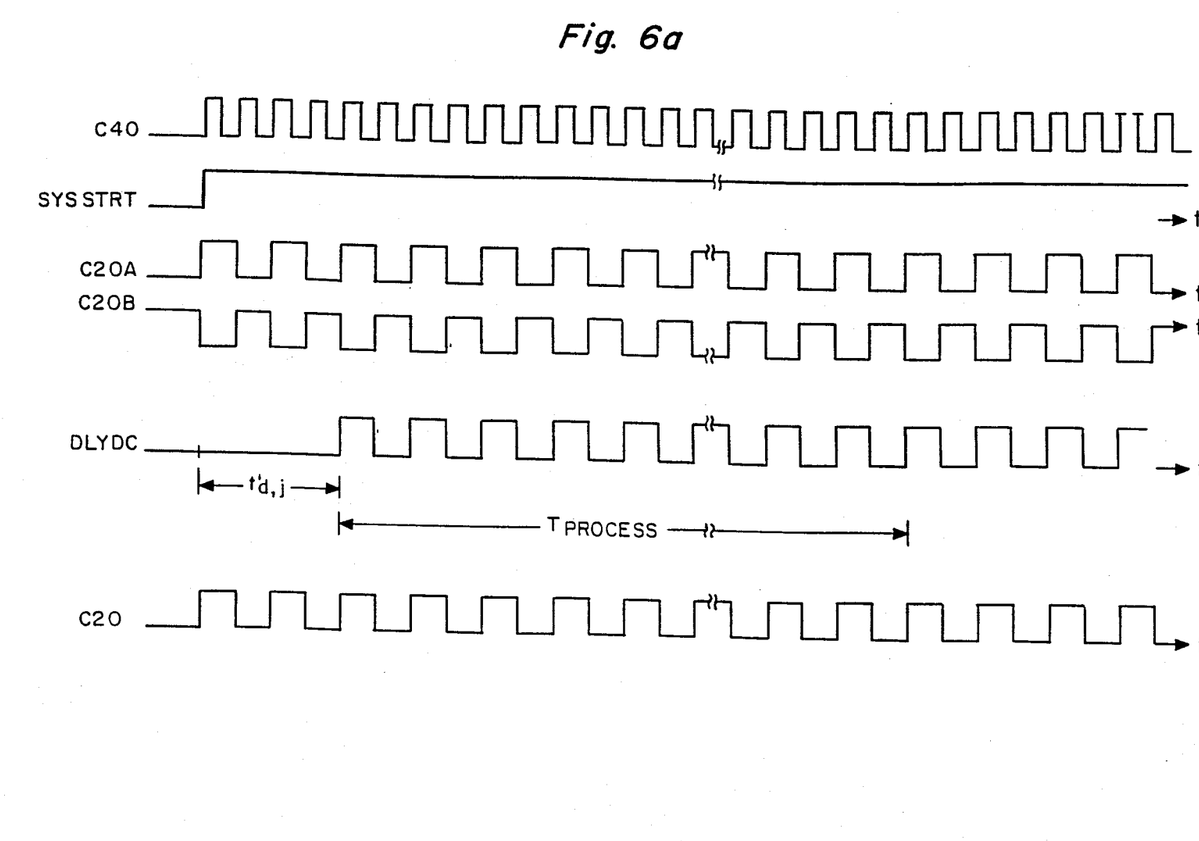
FIG. 6a is a set of time-interrelated waveforms found in the channel receiver means of FIGS. 5.
Figure 6B:
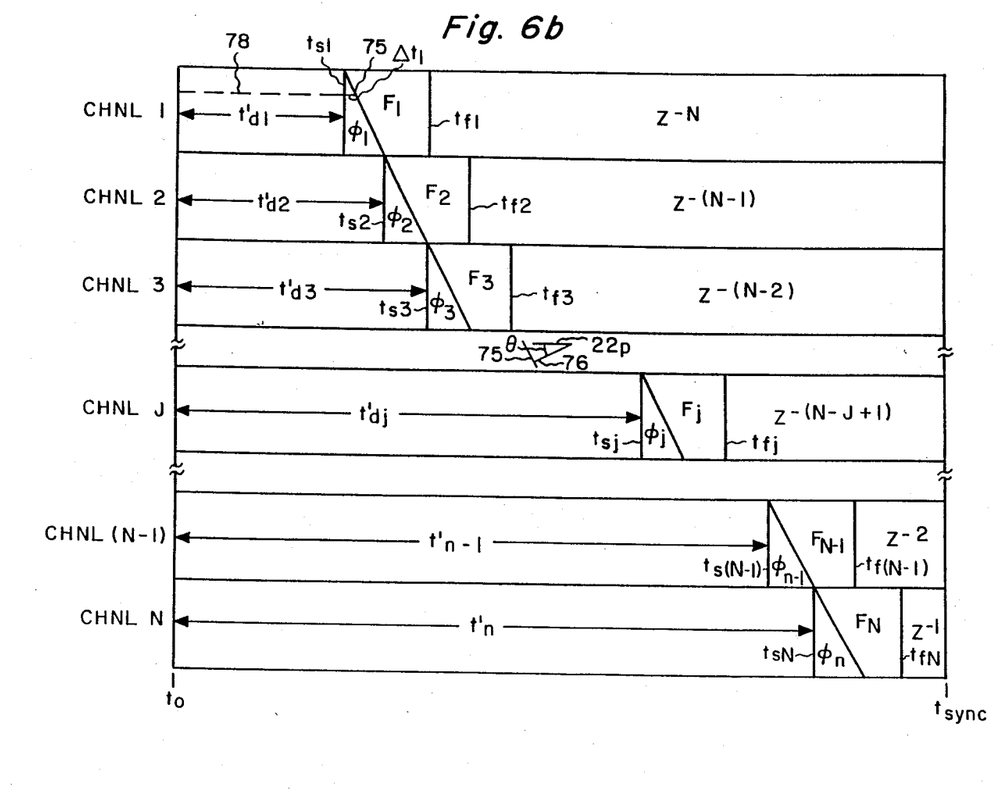
FIG. 6b is a multiple channel versus time schematic useful in understanding operation of the novel phased array beam forming apparatus of the present invention.

Referring now to FIG. 6a and 6b, operation of the beam former proceeds as follows the master clock MCLK signal is a selected one of 4-phases of a 160 MHz master signal, so that a selected 40 MHz signal C40 is provided at input 46b. Responsive to the system start (SYSSTRT) signal at input 46a attaining a high logic level, at time $t_0$, the master clock is counted into a pair of complementary clock signal pulse trains C20A and C20B, at one half the input frequency, e.g. at 20 MHz here. Here, clock signal C20A serves as the channel common clock C20 signal. Responsive to the range R and direction $\theta$ data received at inputs 46c/46d, and the hard-wired channel number (j), the j-th channel control means 46 calculates the delay time $t_{d,j}$ for that channel. Means 46 then calculates the greatest number of complementary-clock C20A/C20B half-cycles which are not more than half-cycle removed (greater than OR less than) from this delay time; this sets the length of a coarse delay time $t'_{d,j}$. Once the proper phase and number of coarse clock signal pulses are selected, the delayed clock (DLYDC) signal at output 40a is provided as that selected one of the half-frequency clock signals (e.g. the C20A signal), commencing after the calculated coarse delay time $t'_{d,j}$ has elapsed after the system start time $t_0$, i.e. C20 signals start at time $t_1$. Another valid coarse time delay method provides a continuous clock to the ADC and initial flip-flop means, with that clock being selected as one of clock signals C20A or C20B. Data input to the demodulator are then ignored (i.e. not processed) until the coarse time delay is counted down. In either case, once the delayed clock pulses have started at time $t_1$ and for a processing time interval $T_{PROCESS}$ thereafter, the baseband (BBCLK) clock is provided at output 46h; the BBCLK clock is obtained by division of the common clock C20 signal waveform by the decimation number D (here a 4:1 decimation, D=4, is used; thus, the baseband clock is a 5 MHz clock C5) having its first transition from a logic "zero" value at time $t_1$. The phase rotator means 28 is used to effect an additional fine time difference $\Delta t$ in the effective channel delay interval by rotating the complex phasor through an angle $\Delta\phi = \omega_o \Delta t$, where $\omega_o = 2\pi f_o$, at the demodulator frequency $f_o$. The fine delay time can be a positive offset ($+\Delta t$ if $\Delta\phi$ is positive) or a negative offset ($-\Delta t$ if $\Delta\phi$ is negative). The effect of such fine time delay $\Delta t$ is to complete the total time delay (i.e. $t_{d,j} = t'_{d,j} \pm \Delta t$) for the particular channel, where $\Delta t$ is less than one-half of a clock time interval. Typically, a 5-stage CORDIC rotation provides accuracy of about $\pm 7°$. For a demodulator frequency of 5 MHz, a 7° phase accuracy represents an equivalent time delay of about 4 nanoseconds. Thus, the delayed-sampling-plus-phase-rotation approach of the present invention is capable of an equivalent 4 nSec. time delay accuracy using an ADC clock operating at only 20 MHz (i.e. at 50 nSec. intervals).

Another way to view the effect of $\Delta t$ is seen in FIG. 6b. The received signal has a slanted wavefront line 75 which is perpendicular to the reflective wave line-of-travel 76 of the signal-to-be-received, which line-of-travel 76 is at angle $\theta$ to array normal 22p; because each CHNL is shown with some vertical dimension and is actually better represented by a single line (e.g. broken line 78 in channel 1) there is one location in each CHNL which has the time delay which must be added in that channel, after time $t_0$, to make the data in all channels lie along line 74. Because the vertical width of each CHNL strip signifies the total fine delay time range needed, a range of $\Delta\phi$ will be seen to be necessary. An additional channel time is then needed, after the $t_{d,j}$ delay, to cause all channel data to coincide at a synchronization time $t_{sync}$, at which time a coherent sum can be performed. By selection of the proper half-cycle phase of the DLYDC signals, the coarse delay times $t'_{d1} - t'_n$ of the associated channels $1-N$ can be selected, given R and $\theta$. This determines when channel sampling starts at time $t_{sj}$, for the j-th channel; a preselected number s of samples are then sequentially taken in that channel. A fine delay time represented by $\phi_{js}$ is then needed for each sample word, after delayed sampling, to attain the wavefront line 75. This additional time delay-phase shift is provided by the rotator. Thereafter, the now-properly-timed wavefront samples need a channel equalization delay before coherent summation of the first sample data words can be accomplished, and the rest of the samples sequentially summed, as they appear. The channel FIFO provides an initial delay, until a time $t_{fj}$, in the j-th channel; this time is a multiple of the BBCLK clock period, and is selected so that the difference between the channel FIFO first-sample output time $t_{fj}$ and the sync time $t_{sync}$ is an integer number of delay ($Z^{-1}$) time intervals; the number of such $Z^{-1}$ intervals, in the j-th channel, is $(N-j+1)$. This choice of delay assures proper data word arrival at each position (i.e. each channel) along the summation pipeline.

While several presently preferred embodiments of our novel invention have been described in detail herein, many modifications and variations will now become apparent to those skilled in the art. It is our intent, therefore, to be limited only by the scope of the appending claims and not by the specific details and instrumentalities presented by way of explanation herein.

What is claimed is:

1. A method for digitally forming a beam of energy substantially focussed at a range R and at an angle $\theta$ with respect to a transducer array having a plurality N of transducers, each in a separate channel and receiving a portion of the energy of the beam, comprising the steps of:
   (a) separately generating for each j-th channel, where $1 \leq j \leq N$, a stream of sampling strobe signals at a fixed common sample rate F;
   (b) converting the amplitude of an analog signal from the transducer in each channel into a baseband data signal comprised of consecutive data words each responsive to one of said strobe signals;
   (c) digitally processing only those baseband data signals converted, in the j-th channel, after a coarse time delay, determined by range R and angle $\theta$ and unique to that channel, has elapsed after a start time to common to all N channels;
   (d) phase rotating the baseband data signals in each channel by a fine time delay to obtain a total delay time in each channel predetermined by range R and angle $\theta$, and
   (e) coherently summing all N of the separately-delayed baseband data signal streams to obtain a single set of digital baseband data words representing at least amplitude information from the formed energy beam.

2. The method of claim 1, wherein step (b) includes the step of continuously converting the analog signal amplitude responsive to a continuous stream of strobe signals; and step (c) includes the step of ignoring all baseband data signals in the j-th channel until the coarse time delay for that j-th channel has elapsed.

3. The method of claim 1, wherein step (d) comprises the step of performing a CORDIC multiplication of each baseband data signal word by a digital word $\Delta\phi$ selected to provide the predetermined fine time delay.

4. The method of claim 1, wherein step (a) includes the step of providing a continuous clock signal at the fixed common rate F; and step (c) includes the steps of: calculating for each j-th channel a total channel delay time $t_{d,j}$; calculating a greatest integer number of clock signal half-cycles which is not more than one half-cycle removed from the total delay time; and setting the j-th channel coarse time delay $t'_{d,j}$ to contain that integer number of clock signal half-cycles.

5. The method of claim 4, wherein the total channel delay time includes a steering component $(X_j/V)\sin\theta$, wherein $X_j$ is the position of the j-th transducer with respect to the center of the array and V is a velocity of energy in a propagation medium.

6. The method of claim 5, wherein the total channel delay time also includes a focusing component $X_j^2/2RV)\cos^2\theta$.

7. The method of claim 6, wherein step (d) comprises the step of performing a CORDIC rotation of each baseband data signal word by a digital word $\Delta\phi$ selected to provide the predetermined fine time delay.

8. The method of claim 5, wherein step (d) comprises the step of performing a CORDIC rotation of each baseband data signal word by a digital word $\Delta\phi$ selected to provide the predetermined fine time delay.

9. The method of claim 4, wherein step (d) comprises the step of performing a CORDIC rotation of each baseband data signal word by a digital word $\Delta\phi$ selected to provide the predetermined fine time delay.

10. The method of claim 1, wherein step (e) includes the step of delaying the phase-rotated data words of each channel by a time interval sufficient to cause all like-numbered data signals to substantially simultaneously appear for summation.

11. The method of claim 10, wherein the delaying step includes the steps of: delaying the phase-rotated data words in each channel by one clock time interval; adding the delayed rotating data word to data received from another channel to obtain sum data; and providing the sum data to a channel in an opposite direction in the array, from the another channel, until all channel data is pipelined summed.

12. Apparatus for digitally forming a beam of energy substantially focussed at a range R and at an angle $\theta$ with respect to a transducer array having a plurality N of transducers, each in a separate channel and receiving a portion of the energy of the beam, comprising:
    means for separately generating for each j-th channel, where $1 \leq j \leq N$, a stream of sampling strobe signals at a fixed common sample rate F,
    means for converting the amplitude of an analog signal from the transducer in each channel into a baseband data signal comprised of consecutive data words each responsive to one of said strobe signals;
    means for digitally processing only those baseband data signals converted, in the j-th channel, after a coarse time delay, determined by range R and angle $\theta$ and unique to that channel, has elapsed after a start time $t_o$ common to all N channels;
    means for phase rotating the baseband data signals in each channel by a fine time delay to obtain a total delay time in each channel predetermined by range R and angle $\theta$, and
    means for coherently summing all N of the separately-delayed baseband data signal streams to obtain a single set of digital baseband data words representing at least amplitude information from the formed energy beam.

13. The apparatus of claim 12, wherein the generating means provides a continuous stream of strobe signals; and the processing means ignores all baseband data signals in the j-th channel until the coarse time delay for that j-th channel has elapsed.

14. The apparatus of claim 12, wherein said rotating means comprises means for CORDIC multiplication of each baseband data signal word by a digital word $\Delta\phi$ selected to provide the predetermined fine time delay.

15. The apparatus of claim 12, wherein said generating means receives a clock signal at the fixed common rate F, and comprises: means for calculating for each j-th channel (a) a total channel delay time $t_{d,j}$, and (b) a greatest integer number of clock signal half-cycles which is not more than one half-cycle removed from the total delay time;, and means for setting the j-th channel coarse time delay $t'_{d,j}$ to contain that integer number of clock signal half-cycles.

16. The apparatus of claim 15, wherein said converting means includes: ADC means for converting the amplitude of said channel analog signal to a data word at each strobe signal at said fixed rate F once said strobe signals commence; and means for demodulating a stream of said data words to baseband.

17. The apparatus of claim 16, wherein said converting means also includes means or decimating the data word stream by a preselected decimation factor D.

18. The apparatus of claim 16, wherein said converting means also includes FIFO means for temporarily storing the stream of baseband data words for a commanded time interval.

19. The apparatus of claim 12, wherein the summing means includes means for delaying the phase-rotated data words of each channel by a time interval sufficient to cause all like-numbered data signals to substantially simultaneously appear for summation.

20. The apparatus of claim 19, wherein the delaying means includes: means for delaying the phase-rotated data words in each channel by one clock time interval; means for adding the delayed rotating data word to data received from another channel to obtain sum data; and providing the sum data to a channel in an opposite direction in the array, from the another channel, until all channel data is pipelined summed.

21. The apparatus of claim 20, wherein said providing means includes gating means for steering incoming data from a selected one of an immediately-previous channel or an immediately-next channel to a summing means input and for steering sum data to a remaining one of the immediately-previous and immediately-next channels.

* * * * *